United States Patent Office 3,531,539
Patented Sept. 29, 1970

3,531,539
ISOBUTENE SEPARATION WITH A
MOLECULAR SIEVE
Calvin M. Tidwell, Houston, Tex., assignor to Petro-Tex Chemical Corporation, Houston, Tex., a corporation of Delaware
No Drawing. Filed Feb. 15, 1968, Ser. No. 705,630
Int. Cl. C07c 3/10, 11/02
U.S. Cl. 260—677    17 Claims

ABSTRACT OF THE DISCLOSURE

Process for separation of isobutene and production of di-isobutene under pressure using molecular sieves having a pore opening of about 8 A. to 8.2 A.

BACKGROUND OF THE INVENTION

This invention relates to a novel method for the separation of isobutene from a mixed stream containing butenes and isobutene and to a novel preparation of di-isobutylene. More particularly, the invention relates to a novel manner of separation of isobutene from streams containing n-butene-1 and which may contain other saturated or unsaturated hydrocarbons, wherein the separation is effected by the use of a molecular sieve of a specified type, and which results in the production of di-isobutylene. The process of the invention is admirably suited to the separation of minor amounts of isobutene from a mixed stream containing a major amount of butenes. In its most preferred form the invention contemplates the employment of specific molecular sieves for the separation of isobutylene from a mixed stream containing butenes, butadiene, and other miscellaneous hydrocarbons wherein the butenes comprise at least 50 percent of the stream and the amount of butadiene present in the mixed stream is 3 percent or less.

In the separation of isobutene from a mixed stream containing butenes and possibly other hydrocarbons, a significant problem exists since these materials cannot be separated by normal fractional distillation methods due to the closeness of their boiling points. One known manner of separating these components is to pass the mixture through what is termed a cold acid extraction procedure wherein the stream is fed into a bath of concentrated sulfuric acid and separation is achieved by virtue of the solubility of the isobutene in the sulfuric acid, the n-butene and other hydrocarbons present passing overhead. An improved version of this process is described by Gay and Tidwell in U.S. Pat. 2,981,767. While cold acid extraction is effective for the removal of substantial amounts of the isobutene, an improved method of separation is needed since the overhead contains residual amounts of isobutene. The present invention therefore has for its object the provision of an improved process for the separation of isobutene from a mixed stream containing butenes and isobutene, and also from streams containing, in addition, other miscellaneous hydrocarbons, such as butene-2, butane, butadiene, etc. It is an additional object of this invention to provide an improved process for the removal of isobutene from streams containing n-butenes and from mixed hydrocarbon feed streams wherein substantial amounts of the isobutene have been removed previously by virtue of a cold acid extraction or similar procedure. Further objects and attainments of the invention, including a novel method of preparing di-isobutylene, will be apparent upon further reading of this disclosure.

SUMMARY OF THE INVENTION

The present invention therefore comprises a method for separation of isobutene from a mixture comprising n-butene and isobutene, and additionally provides an efficient method of separation of isobutene from mixtures comprising components such as n-butene, isobutene, butadiene-1,3, and other miscellaneous hydrocarbons, by contacting the isobutene containing mixture with at least one crystalline molecular sieve having an effective pore opening of from about 8 angstroms to about 8.2 angstroms at an elevated temperature and at a pressure sufficient to maintain the mixture in the liquid phase. The isobutene in the stream is converted primarily to di-isobutene which may be easily separated from the stream by conventional separation techniques. The invention therefore additionally includes a novel manner of preparing di-isobutene. The process of the invention is directed further to the separation of minor amounts of isobutene (less than 50 percent) from streams containing a major amount (at least 50 percent) of normal butenes. All parts or percentages are by weight unless otherwise specified. More particularly the invention comprises a process for separating isobutene from the above described mixtures wherein the mixture is contacted with a least one bed of a crystalline molecular sieve comprising or consisting essentially of an alkali or alkaline earth metal aluminum silicate or mixtures thereof having a pore opening of from about 8 A. to about 8.2 A. at a temperature of from 0° C. to about 150° C. and at a pressure sufficient to maintain the mixture in the liquid phase. The preferred alumino-silicates are those of Na, K, and Ca or mixtures thereof. In its most preferred form the invention comprises a separation procedure wherein the isobutene containing mixture is contacted with at least one bed of a crystalline molecular sieve having the general formula

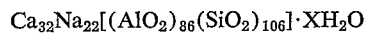

$$Ca_{32}Na_{22}[(AlO_2)_{86}(SiO_2)_{106}] \cdot XH_2O$$

at a temperature of from 0° C. to 150° C. and at a pressure sufficient to maintain the mixture in a liquid phase. (The water content of the molecular sieve employed is dependent on temperature and thus is indicated in the formula as "X." "X" may vary from 0 to about 32, although these values are not to be taken as delimiting.) The method of the invention is particularly effective where a portion of the isobutene has already been removed, and better results are obtained where the hydrocarbon stream contains only from 0 to about 3 percent butadiene-1,3. Excellent results are obtained where the mixture contains 0.3 percent or less of butadiene. Either a natural or synthetic zeolite may be used, so long as the indicated pore opening is present. The preferred molecular sieves are those of the pore size indicated and having a pore diameter of about 10 angstroms. These are generally referred to as 10X molecular sieves the "10" designating the approximate pore diameter in angstroms and the X designating the type crystalline structure involved. The preparation of the molecular sieve in synthetic form for use in the invention forms no part of the present invention but rather is carried out in accordance with well established procedures in the art.

It is preferred that dehydrated molecular sieves be used or that the sieves be "activated" in order for superior results to be obtained. "Activation" is accomplished merely by driving out any water of hydration which is present interstitially in order to open the cavities for admission of the materials to be separated. The activation may be carried out as a separate step or, alternately, by merely heating the sieve or reactor contents as a part of the start-up of the process. If fresh sieve material is added to a system already in operation, the material should be preheated to dehydrate and activate the fresh material. An efficacious manner of activating the sieve is to heat the catalyst in an inert atmosphere at a temperature of about 300° C. to 350° C. for about one-half hour before commencing the introduction of the feedstream.

The temperature of the system is significant and should be maintained at from about 0° C. to about 150° C. Excellent results are obtained at a temperature of from about 50° C. to about 150° C., while the preferred temperature range is from about 80° C. to about 120° C.

The pressure of the system is similarly important and must be maintained at a sufficient level to keep the stream in the liquid phase. For example, the pressure may be varied from 1 to 75 atmospheres, or even greater, depending on the temperature of operation. It is within the skill of the art to adjust the pressure of the system to maintain a liquid phase.

It is an advantage of the invention that good flow rates may be employed. Good results may be obtained with flow rates of the feed mixture ranging from about 1 to 14 liquid volumes of the mixture fed per volume of the reactor containing the sieve used per hour (referred to as LHSV), the volumes of feed stock being calculated as the equivalent amount of liquid hydrocarbons at standardized conditions of 25° C. and 3 atmospheres of pressure. Flow rates of from about 8 to about 10 liquid volumes of feed mixture per volume of sieve per hour will produce excellent results, with an optimum rate at about 9.5 LHSV.

The residence or contact time of the stream in the reaction zone depends on several factors. Contact time is the calculated dwell time of the feedstream in the reaction zone assuming the mols of product are equivalent to the mols of feed. Contact times such as about 200 to 3600 seconds may be used, with optimum results being achieved using contact times of from 300 to 400 seconds. Under certain conditions, higher contact times may be utilized.

Although this process is applicable, as noted, to mixtures of isobutene and n-butene or butenes in general, it is admirably suited to separation of isobutene and production of di-isobutene from fractionated by-product refinery streams containing $C_4$ hydrocarbons such as n-butene, isobutane, butene-1, butene-2, isobutene, and other miscellaneous hydrocarbons. A sample refinery stream, for instance, might contain from 3% to 65% butene-2, 3% to about 90% n-butane, 1% to about 65% butene-1, 0.1% to 50% isobutene, 0.01 to 10.0% butadiene, and 0.1 to 10% miscellaneous hydrocarbons. In practice it is preferred that the stream contain at least a major amount of n-butenes including butene-1, minor amounts of isobutene being present, and other hydrocarbons permitted. In its most preferred form the invention contemplates a separation of isobutene from hydrocarbon streams of the type described wherein no butadiene or only an insubstantial quantity, e.g., up to 3 percent, is present. In this instance any butadiene present originally in the fractionated refinery stream or other source may have been removed by purification or hydrogenation prior to the treatment according to the invention. For example, if the refinery stream contains large amounts of isobutene and significant amounts of butadiene-1,3, the stream may first be hydrogenated and then treated by the cold acid process mentioned before treatment according to the invention.

As pointed out, the di-isobutene formed by the contact with the molecular sieves of the invention may be separated from other components by conventional techniques. For example, separation from butene may be achieved by simple fractionation, since the difference in boiling points is on the order of about 100 degrees centigrade. Or alternately, the lighter components of the stream, including butene-1, may be steam stripped, the butene passing overhead and the di-isobutene being taken off as bottoms.

The results of the invention are surprising since the separation is achieved not, as might be expected, merely by adsorption, but by more complex phenomena. As noted, much of the isobutene is converted on its entry into the bed into a mixture of di-isobutylene, and higher homologs of isobutene, as well as some reaction products of isobutene and the other butenes present. Additional evidence relating to the primarily non adsorptive nature of the instant process is that the isobutene removal rate does not show, when graphed, the sharp break typical of simple adsorption, but undergoes a gradual decline. Also, the sieve cannot be regenerated by heating in a stream of inert gas, as is common in many separations with molecular sieves, but must be burned off at a controlled rate in a stream containing dilute oxygen at temperatures at least 100 degrees (centigrade) higher than are needed to effect the removal of adsorbed compounds.

Example 1

A stream containing approximately 25.3 parts n-butene-1 by volume per part of isobutene was fed at a pressure of 21 atmospheres, an LHSV of 6.6 and at a temperature of about 102° C. into a reactor containing a molecular sieve of the formula $Ca_{32}Na_{22}[(AlO_2)_{86}(SiO_2)_{106}] \cdot XH_2O$ wherein $X=0$ (the sieve was preheated at 300° C. prior to introduction of the stream). Analysis of the product stream showed removal of the isobutene at a rate of 92.5 percent.

Example 2

A stream comprising approximately 16.9 parts butene-1 by volume per part of isobutene was fed at a pressure of 21 atmospheres, an LHSV of 5.8 and at a temperature of approximately 100° C. into a reactor containing a regenerated molecular sieve of the formula $$Ca_{32}Na_{22}[(AlO_2)_{86}(SiO_2)_{106}] \cdot XH_2O$$

where $X=0$. The sieve had been heated during the regeneration in the presence of 2.5 percent oxygen (3 percent is a practical maximum) to approximately 405° C. prior to introduction of the feed stream. Removal of the isobutene was at the level of 92.7 percent.

Example 3

A fractionated refinery stream containing approximately 18.9 parts n-butane, 55.11 parts butene-1, 2.94 parts isobutene, 22.04 parts of trans butene-2, 0.83 part cis butene-2 and 0.18 part butadiene, all by volume, was introduced into a reactor in the manner of Example 1 at a temperature of 90° C., a pressure of 21 atmospheres, and an LHSV of 12.2. Removal of the isobutene from the stream was at a high level.

Example 4

The procedure of Example 3 is repeated except that the temperature was raised to 102° C. and the pressure was increased to 21 atmospheres. Removal of the isobutene was at a level of 95.2 percent.

Example 5

A stream similar in composition to that in Example 4 is introduced into a reactor containing a sieve of the formula $Ca_{32}Na_{22}[(AlO_2)_{86}(SiO_2)_{106}] \cdot XH_2O$ wherein $X=0$, at a pressure of about 20 atmospheres and a temperature of about 100° C. Removal of isobutene is at a high level, and di-isobutene is separated from the product stream in good yields by fractionation.

While there are above disclosed but a limited number of embodiments of the process of the invention herein presented, it is possible to produce still other embodiments without departing from the inventive concept herein disclosed, and it is desired therefore that only such limitations be imposed on the oppended claims as are stated therein, or required by the prior art.

I claim:

1. A process for separation of isobutene from a mixture comprising a major amount of butene-1 and a minor amount of isobutene comprising passing said mixture through at least one bed of a crystalline molecular sieve having an effective pore opening of about 8 A. to about 8.2 A. at a temperature of from about 0° C. to about 150° C. and at a pressure sufficient to maintain the mixture in the liquid phase, and recovering a product stream comprising butene-1 and having a substantially reduced isobutene content.

2. The process of claim 1 wherein di-isobutene is separated from the product stream and recovered.

3. The process of claim 2 wherein the mixture has been pretreated by cold acid extraction.

4. The process of claim 3 wherein the mixture is hydrogenated prior to the cold acid extraction.

5. The process of claim 14 wherein di-isobutene is separated and recovered from the product stream.

6. The process of claim 5 wherein the mixture contains less than 3 percent butadiene by weight.

7. The process of claim 6 wherein the temperature is from 50° C. to 120° C.

8. The process of claim 1 wherein the crystalline molecular sieve comprises an alkali metal—or alkaline earth metal—aluminum silicate zeolite having a pore opening of from about 8 A. to about 8.2 A.

9. The process of claim 8 wherein the zeolite is selected from the group comprising sodium, potassium and calcium silicate zeolites.

10. The process of claim 9 wherein the molecular sieve is of the formula $Ca_{32}Na_{22}[(AlO_2)_{86}(SiO_2)_{106}] \cdot XH_2O$ wherein X represents a variable water content inclusive of O.

11. The process of claim 1 wherein the molecular sieve is of the formula $Ca_{32}Na_{22}[(AlO_2)_{86}(SiO_2)_{106}] \cdot XH_2O$ wherein X represents a variable water content inclusive of O, and the mixture contains less than 3 percent butadiene-1,3 by weight.

12. The process of claim 10 wherein the mixture has been pretreated by cold acid extraction.

13. The process of claim 12 wherein the mixture is hydrogenated prior to the cold acid extraction.

14. The process of claim 13 wherein di-isobutene is separated and recovered from the product stream.

15. The process of claim 11 wherein the mixture has been pretreated by cold acid extraction.

16. The process of claim 15 wherein the mixture is hydrogenated prior to the cold acid extraction.

17. The process of claim 16 wherein di-isobutene is separated and recovered from the product stream.

References Cited

UNITED STATES PATENTS

| | | | |
|---|---|---|---|
| 2,981,767 | 4/1961 | Gay et al. | 260—677 |
| 3,061,654 | 10/1962 | Gensheimer et al. | |

FOREIGN PATENTS

| | | |
|---|---|---|
| 850,415 | 10/1960 | Great Britain. |
| 888,952 | 2/1962 | Great Britain. |
| 655,439 | 1/1963 | Canada. |

DELBERT E. GANTZ, Primary Examiner

J. S. NELSON, Assistant Examiner

U.S. Cl. X.R.

260—683.15

PO-1050
(5/69)

UNITED STATES PATENT OFFICE
CERTIFICATE OF CORRECTION

Patent No. 3,531,539           Dated Sept. 29, 1970

Inventor(s) Calvin M. Tidwell

It is certified that error appears in the above-identified patent and that said Letters Patent are hereby corrected as shown below:

In the claims, claim 5 should be dependent on claim 10 so that claim 5 reads as follows:

5. The process of claim 10 wherein di-isobutene is separated and recovered from the product stream.

Signed and sealed this 28th day of September 1971.

(SEAL)
Attest:

EDWARD M. FLETCHER, JR.
Attesting Officer

ROBERT GOTTSCHALK
Acting Commissioner of Patents